United States Patent [19]

George et al.

[11] Patent Number: 5,393,804
[45] Date of Patent: Feb. 28, 1995

[54] BIODEGRADABLE COMPOSITIONS COMPRISING STARCH AND ALKENOL POLYMERS

[75] Inventors: Eric George, Morris Plains; Eddie Park, Morristown; Paul A. Altieri, Belle Mead; Charles W. Paul, Madison, all of N.J.

[73] Assignee: Parke, Davis & Company, Morris Plains, N.J.

[21] Appl. No.: 71,429

[22] Filed: Jun. 10, 1993

Related U.S. Application Data

[63] Continuation-in-part of Ser. No. 980,862, Nov. 24, 1992.

[51] Int. Cl.$^6$ .................. C08L 3/00; C08L 29/04
[52] U.S. Cl. .................. 523/128; 523/124; 524/47; 524/52; 524/53; 524/503; 524/524; 524/557
[58] Field of Search .................. 523/124, 125, 128; 524/47, 52, 53, 503, 524, 557

[56] References Cited

U.S. PATENT DOCUMENTS

| | | | |
|---|---|---|---|
| 2,412,213 | 12/1946 | Groen | 260/234 |
| 2,654,736 | 10/1953 | Caldwell | 260/233.5 |
| 2,660,577 | 11/1953 | Kerr | 260/233.5 |
| 3,038,895 | 6/1962 | Rutenberg et al. | 260/233.3 |
| 3,117,014 | 1/1964 | Klug | 106/213 |
| 3,184,335 | 5/1965 | Germino et al. | 127/71 |
| 4,061,610 | 12/1977 | Glowaky et al. | 260/17.4 ST |
| 4,125,495 | 11/1978 | Griffin | 260/17.4 ST |
| 4,207,355 | 6/1980 | Chiu et al. | 536/106 |
| 4,379,138 | 4/1983 | Pitt et al. | 424/78 |
| 4,673,438 | 6/1987 | Wittwer et al. | 106/126 |
| 4,726,809 | 2/1988 | DeBoer et al. | 8/115.6 |
| 4,726,957 | 2/1988 | Lacourse et al. | 426/578 |
| 4,738,724 | 4/1988 | Wittwer et al. | 106/213 |
| 4,900,361 | 2/1990 | Sachetto et al. | 106/213 |
| 4,931,488 | 6/1990 | Chiquet | 523/126 |
| 5,051,222 | 9/1991 | Marten et al. | 264/143 |
| 5,087,650 | 2/1992 | Willett | 524/47 |
| 5,095,054 | 3/1992 | Lay et al. | 524/47 |
| 5,137,969 | 8/1992 | Marten et al. | 525/56 |
| 5,158,810 | 10/1992 | Oishi et al. | 428/35.4 |
| 5,205,863 | 4/1993 | Elion | 106/154.1 |
| 5,234,977 | 8/1993 | Bastioli et al. | 524/47 |

FOREIGN PATENT DOCUMENTS

| | | | |
|---|---|---|---|
| 0394803 | 10/1990 | European Pat. Off. | C08L 1/10 |
| 0408503 | 1/1991 | European Pat. Off. | C08L 3/02 |
| 0415357 | 3/1991 | European Pat. Off. | C08L 29/04 |
| 501889 | 7/1930 | Germany | 39/12 |
| 0016584 | 10/1992 | WIPO | 523/128 |
| 0019680 | 11/1992 | WIPO | 523/124 |

*Primary Examiner*—Peter Szekely
*Attorney, Agent, or Firm*—Fitzpatrick, Cella, Harper & Scinto

[57] ABSTRACT

There is provided a biodegradable composition as obtained from a melt comprising converted starch, a plasticizer and at least one member selected from alkenol homopolymers and/or alkenol copolymers which are combined under conditions sufficient to ensure uniform melt formation, in which the at least one member is present in the composition at a concentration of from 10 to 200 parts per 100 parts of dry converted starch.

The invention further relates to methods of making the composition, and to articles made from said composition.

45 Claims, No Drawings

BIODEGRADABLE COMPOSITIONS COMPRISING STARCH AND ALKENOL POLYMERS

This application is a continuation in part of U.S. patent application Ser. No. 07/980,862, filed Nov. 24, 1992. This application is hereby incorporated by reference herein.

The present invention relates to biodegradable polymer compositions capable of being formed by heat and pressure into articles having dimensional stability. The invention relates particularly to biodegradable compositions comprising a converted starch and at least one member selected from alkenol homopolymers and/or alkenol copolymers. Such compositions are suitable for use, inter alia, in extrusion, in film formation, in the formation of foamed packaging materials or injection molding.

BACKGROUND OF THE INVENTION

It is known that natural starch which is found in vegetable products can be treated at elevated temperatures to form a melt.

Such a melt may preferably be formed by heating the starch material above the glass transition and melting temperatures of its components so that such undergo endothermic rearrangement. Preferably the starch material contains a defined amount of a plasticizer, which preferably is water, and melt formation is carried out at an elevated temperature in a closed volume, and hence at an elevated pressure.

It is possible to melt starch substantially in the absence of water, but in the presence of another suitable plasticizer, for example a liquid having a boiling point higher than the starch glass transition and melting temperature.

Different degrees of uniformity in melt formation, which can be measured by various methods, are possible. One method, for example, is to microscopically determine the amount of granular structure remaining in a starch melt. It is preferred that the starch is destructurised, viz, that the melt is substantially uniform in character, that light microscopy at a magnification of about 500×, indicates a substantial lack of, or reduction in, granular structure, that the starch so melted exhibits little or no birefringence and that X-ray studies indicate a substantial, reduction in, or lack of, starch crystallinity in the melt.

It is implicit in the art of forming thermoplastics that the major components thereof should be of high molecular weight. This is the case also for the use of native starch in melt formation processes and for articles obtained therefrom. However, when blending native starch, in many cases such native starch is difficult to process and also difficult to blend with an alkenol homopolymer and/or an alkenol copolymer, because a relatively high amounts of plasticizer as well as energy input is required in order to achieve uniform melt formation and maximum physical properties of the shaped articles obtained from such a melt. Neat converted starch exhibits enhanced processability but lower strength and elongation to break as expected. The lower molecular weight of converted starch leads to enhanced crystallysability and higher modulus in neat systems.

It has now been discovered that native starch can be replaced by "converted" starches, i.e. a starch with a much lower average molecular weight than native starch. The advantages of using converted starches are enhanced processability of the converted starch-/polymer blends. Concomitant the converted starch reduces the amount of plasticizer as well as the energy input necessary to provide uniform melt formation. As a consequence higher production speeds are possible. Surprisingly an improved mixing behaviour in blends with other synthetic polymers is observed resulting in a very uniform and often single phase product. The improved physical properties in blends are novel and, in view of the reduced average molecular weight of the starch, also very surprising.

Converted starches are prepared by degradation of starch molecules yielding products of lower dispersion viscosities than the original starch. Such products are known. Although many of the properties of the original starch are changed during the conversion process the main purpose of said process is to reduce the viscosity of the raw starch. The conversion process involves breaking, rearranging and/or recombining the starch chains for example in the presence and through the action of acids, alkalies, enzymes, oxidizing agents and-/or heat. An important effect is the cutting of the chain lengths to lower average molecular weights. Controlled acid hydrolysis yields "thin-boiling" or "fluidity" starches in a wide range of viscosities wherein this hydrolysis is carried out below the gelatinization point of the starch. Acid hydrolysed corn starch is most preferred. The higher the "fluidity" the more degraded is the starch and in consequence the less, viscous is the dispersion for a given concentration. Acid conversion is preferred due to the ease of handling and recovery afforded by a granular starch as for example opposed to starch in dispersed form as necessitated by enzyme conversion. However, the means of producing the converted starch is of no importance for carrying out the present invention. These starches are generally named "converted starch" and this term will be used herein.

The degree of conversion is given herein as a 8.8% solids calcium chloride viscosity in seconds. Such calcium chloride viscosity values are known in the art and are for example described in the U.S. Pat. No. 4,726,957, which procedure is especially suitable for high amylose starch. The procedure of U.S. Pat. No. 4,726,957 can, for example, be modified slightly in that the weight of anhydrous starch is 9.0 grams and 125 grams of 40% calcium chloride solution is used.

U.S. Pat. No. 4,207,355 describes a water fluidity test which is most suitable for all other starches, i.e. starches that are not classified as high amylose starch or contain less than about 30% amylose. In carrying out the present invention it is recommended that the procedure of U.S. Pat. No. 4,726,957 is used for high amylose starches and the procedure of U.S. Pat. No. 4,207,355, is used for all other starches. Of course it is possible to further modifiy these tests. It is no problem for the person skilled in the art to correlate the different viscosity values obtained by the different modified test procedures.

SUMMARY OF THE INVENTION

According to the present invention, there is provided a biodegradable composition as obtained from a melt comprising converted starch, a plasticizer and at least one member selected from alkenol homopolymers and-/or alkenol copolymers which are combined under conditions sufficient to ensure uniform melt formation, and wherein the at least one member is present in the composition at a concentration of from 10 to 200 parts per 100 parts of dry converted starch.

The composition may contain further plasticizers as well further additives. By plasticizer is meant a substance which can be incorporated into a material to increase its flexibility, workability or reduce the melt viscosity, or lower the elastic modulus of the product. The term plasticizer includes all known types of plasticizers such as solvent plasticisers and non-solvent plasticisers.

The invention also includes the melt which is obtained from said composition as well as shaped articles, preferably films, laminates, injection moulded articles or foams made from said melt.

In one embodiment of the composition, the converted starch is derived from a high amylose variety and has an amylose content by weight of up to about 95%, and preferably of between 70 and 95%.

Said converted starch, however, does not have to be derived from a high amylose variety, and may have an amylose content, of up to about 65%, up to about 45%, and up to about 35%. It is possible that the amylose content of the converted starch is between 25 and 35%. The lower limit for the amylose content of the converted starch preferably is about 5 to about 10%, likewise by weight, including for example waxy maize starch.

The composition according to this invention may preferably comprise from about 10 to about 120 parts of said polymer and/or copolymer per 100 parts by weight of dry converted starch, and in a more preferred embodiment, the composition comprises from about 20 to about 85 parts of said polymer or copolymer per 100 parts of converted starch.

The composition may also comprise a polymer or copolymer content of from 10 to 65 parts, and particularly from 20 to 40 parts with respect to 100 parts of converted starch.

The alkenol homopolymer is preferably a polyvinyl alcohol which may be pre-plasticised with a polyhydric alcohol such as glycerol. The polyvinyl alcohol preferably is hydrolysed to an extent of from about 45 and about 100% and preferably has a number average molecular weight of about 15,000 to about 250,000, and more preferably has a number average molecular weight of from 10,000 to 150,000.

It is particularly preferred that the composition contains pre-treated polyvinyl alcohol in the form of a melt, obtained previously by adding sufficient energy to polyvinyl alcohol to melt it and substantially eliminate crystallinity in the melt. It is particularly preferred that the such crystallinity is substantially completely eliminated. Such pre-treatment of polyvinyl alcohol is disclosed in U.S. Pat. No. 5,051,222 and U.S. Pat. No. 5,137,969 and its contents is incorporated herewith by reference.

Alkenol copolymers as mentioned above are preferably synthetic copolymers containing vinyl alcohol units as well as aliphatic units as are obtained by copolymerization of vinyl esters, preferably vinyl acetate with monomers preferably ethylene, propylene, isobutylene and/or styrene with subsequent hydrolysis of the vinyl ester group.

Such copolymers are known and are described in "Encyclopedia of Polymer Science and Technology, Interscience Publ. Vol. 14, 1971".

The composition may further include compounds selected from the group consisting of nucleating agents, fillers, stabilisers, coloring agents and flame retardants and boron containing compounds. Said composition may further include known processing aids, such as lubricants, mould release agents and plasticisers.

It will be appreciated that the concentrations of the components in the composition can be derived according to a master-batching process, if desired.

The invention also provides a method for producing the composition in the form of a melt and optionally processing said melt, e.g. by extrusion, comprising:

a) providing a starting composition comprising converted starch, a plasticizer and at least one member selected from alkenol homopolymers and/or alkenol copolymers which are present in the composition at a concentration of from 10 to 200 parts per 100 parts of said converted starch;

b) adjusting the plasticizer content of the composition to between about 0.5 and about 40% by weight of the total composition during processing or plastification; c) heating the thereby adjusted composition to a temperature of between 100° and 220° C. and for a time at least sufficient to form a uniform melt of the composition;

d) removing any excess moisture before the extruder die to obtain a moisture content of between about 1% and about 20%; and optionally e) extruding the thereby heated composition.

The present invention further includes a melt as obtained according to the method.

The present invention further refers to a method of working said composition under controlled plasticizer content, temperature and pressure conditions as a thermoplastic melt wherein said process is any known process, such as for example, foaming, filming, compression molding, injection molding, blow molding, vacuum forming, thermoforming, extrusion, coextrusion, and combinations thereof.

The invention will be further apparent from the following description, in conjunction with the following examples and the appended claims.

SPECIFIC DESCRIPTION

The present invention is defined in the appended claims. In particular, the invention refers to a biodegradable composition as obtained from a melt comprising converted starch, a plasticizer and at least one member selected from alkenol homopolymers and/or alkenol copolymers which are combined under conditions sufficient to ensure uniform melt formation, in which the at least one member is present in the composition at a concentration of from 10 to 200 parts per 100 parts of dry converted starch. Such a uniform melt is thermoplastic in character.

The converted starch which is present in the composition of the present invention is derived from at least one member selected from the group consisting of native starches of vegetable origin, which starches are derived from potatoes, rice, tapioca, corn, pea, rye, oats, wheat.

Controlled acid hydrolysed starch, so called "thin-boiling" or "fluidity" starch is preferred in a wide range of viscosities wherein this hydrolysis has been carried out below the gelatinization point of the starch so that the granular structure is only weakened. Acid hydrolysed corn starch is most preferred.

The degree of conversion is given herein as a 8.8% solids calcium chloride viscosity in seconds and such specification for converted starch is known as mentioned above. The test procedure to determine the 8.8% calcium chloride viscosity or for example the 7.2% calcium chloride viscosity is as follows.

Calcium Chloride viscosity

A. 8.8% Solids Test

The calcium chloride viscosity of the converted starch is measured by using a Thomas Stormer Rotational Shear-Type Viscometer (manufactured by Arthur H. Thomas Co., Philadelphia, Pa.) standardized at 30° C., with a standard oil having a viscosity of 24.73 cps, which oil requires 23.12±0.05 seconds for 100 revolutions. As conversion of the starch increases, the viscosity of the starch decreases. Accurate and reproducible measurements of the calcium chloride viscosity are obtained by determining the time which elapses for 100 revolutions at a specific solids level. The general procedure is as follows: A total of 8.8 grams of the converted starch (anhydrous basis) is slurried in 100 grams of buffered 20% calcium chloride solution in a covered stainless steel cup, the slurry heated in a boiling water bath for 30 minutes with occasional stirring. Then, the starch solution is brought to the final weight (108.8 grams) with hot distilled water. The time required for 100 revolutions of the resultant solution at 81°–83° C., is measured three times in rapid succession and the average of the three measurements recorded.

The calcium chloride solution is prepared as follows: A total of 264.8 grams of reagent grade calcium chloride dihydrate is dissolved in 650 ml. of distilled water in a tared 1 liter glass beaker. Thereafter 7.2 grams of anhydrous sodium acetate is dissolved in the solution. The solution is allowed to cool and the pH is measured. If necessary, the solution is adjusted with hydrochloric acid to pH 5.6±0.1. Finally, the solution is brought to weight (1007.2 grams) with distilled water.

B. 7.2% Solids Test

The calcium chloride viscosity test described above in Part A is employed with the exception that a 7.2 gram (anhydrous basic) sample of starch is cooked in the calcium chloride solution and the final weight of the starch solution to be evaluated is brought to a final weight of 107.2 grams.

A correlation of 8.8% solids versus 7.2% solids viscosity readings of a series of six acid hydrolysed high amylose starch samples is provided below:

| $CaCl_2$ Viscosity Measurement (sec) | |
| --- | --- |
| 8.8% Solids | 7.2% Solids |
| 95.6 | 40.6 |
| 71.6 | 39.0 |
| 58.7 | 29.3 |
| 40.5 | 24.5 |
| 31.5 | 19.9 |
| 30.2 | 20.4 |

The preferred 8.8% calcium chloride viscosity (fluidity level) for the use in the present invention is from about 5 seconds to about 60 seconds, preferably from about 10 seconds to about 40 seconds and most preferably from about 20 seconds to about 40 seconds.

For certain applications it is preferred that the converted starch is derived from a high amylose starch having an amylose content of between about 60% and about 95%, preferably between about 65% and about 80%, the percentages being by weight with respect to that of the converted starch. The lower limit for the amylose content of the preferably is about 10 to about 15%, likewise by weight.

For certain applications further it is preferred that the converted starch has an amylose content of between about up to about 45%, preferably between about 35%, preferably between about 25% and about 35%, the percentages being by weight with respect to that of the converted starch.

The starch component of the composition according to the invention includes converted starch melted in the absence of added water, but in the presence of another plasticizer—such as glycerol. The preferred plasticizer is, however, water.

The alkenol homopolymer is preferably polyvinyl alcohol (PVA) having a number average molecular weight of at least about 10,000 (which corresponds to a degree of polymerization of at least 240). It is more preferred that the PVA has a number average molecular weight of between about 20,000 and 100,000, and most preferred that it has a number average molecular weight of about 30,000 to 80,000. Where the composition is foamed it is preferred that the number average molecular weight of the polyvinyl alcohol is between about 160,000 and 250,000 and more preferably between 160,000 and 200,000.

Polyvinyl alcohol (PVA) is generally made from hydrolysis, or alcoholysis of polyvinyl acetate. The degree of hydrolysis to provide a polyvinyl alcohol for use in the present invention preferably is from about 70 to about 99.9 mole %, and more preferably is from about 87 to 98 mol %. It is most preferred that the degree of hydrolysis is from about 96 to 98 mol %.

Such polyvinyl alcohols are known and are sold, by Air Products And Chemicals Inc, of 7201 Hamilton Boulevard, Allentown, U.S.A., under the name of Airvol 540S (degree of hydrolysis 87–89%, molecular weight about 106'000–110'000); Airvol 205S (degree of hydrolysis 87–89%, molecular weight about 11'000–31'000), Elvanol 90-50 (degree of hydrolysis 99.0 to 99.8%, molecular weight about 35'000 to about 80'000) and Airvol 107 (degree of hydrolysis 98.0 to 98.8%, molecular weight 11'000 to 31'000).

U.S. Pat. No. 5,051,222 and U.S. Pat. No. 5,137,969 in the name of Air Products and Chemicals Inc, describe extrudable polyvinyl alcohol compositions, and methods for their preparation. The method according to U.S. Pat. No. 5,051,222 and U.S. Pat. No. 5,137,969 comprise adding sufficient energy to the polyvinyl alcohol to both melt it and essentially eliminate the crystallinity in the melt whilst simultaneously removing energy from the melt at a rate sufficient to avoid decomposition of the polyvinyl alcohol.

Accordingly, the present invention contemplates the use in the present inventive compositions of polyvinyl alcohol pre-treated according to the disclosure of U.S. Pat. No. 5,051,222 and U.S. Pat. No. 5,137,969. Thus the present inventive composition contains pre-treated polyvinyl alcohol in the form of a melt which has been obtained previously by adding sufficient energy to polyvinyl alcohol to both melt it and substantially eliminate crystallinity in the melt, whilst simultaneously removing energy from the polyvinyl alcohol melt at a rate sufficient to avoid its decomposition.

The pre-treated polyvinyl alcohol may be plasticised by the addition thereto of a polyhydric alcohol plasticizer in an amount of from 2 to 30% by weight of the polyvinyl alcohol. It is preferred that the pre-treated polyvinyl alcohol is plasticised by the addition thereto of a polyhydric alcohol plasticizer in an amount of from 2 to 20% by weight of the polyvinyl alcohol. The pretreated polyvinyl alcohol may further comprise sodium acetate and phosphoric acid in a molar ratio of about 2 to 1. The sodium acetate is present in the polyvinyl alcohol as a by product of its method of production and under the conditions of melt formation such sodium acetate acts as a catalyst for decomposition of the polyvinyl alcohol. Accordingly, phosphoric acid may be added to the polyvinyl alcohol composition from which the pre-treated polyvinyl alcohol melt is made, in the ratio of 1 mole of acid per 2 moles of acetate, in order to neutralize said sodium acetate. Low ash polyvinyl alcohol, which is essentially free of sodium acetate, does not require the addition of such phosphoric acid.

The pre-treated melt of polyvinyl alcohol has a maximum melt temperature, as determined by differential scanning calorimetry, which is at least about 5° C. lower than that of the corresponding untreated polyvinyl alcohol, preferably at least about 10° C. lower than that of the untreated polyvinyl alcohol, and particularly preferably at least about 15° C. lower than that of the untreated polyvinyl alcohol.

The composition preferably comprises from about 10 to about 100 parts of said PVA per 100 parts of converted starch, and in a particularly preferred embodiment, the composition comprises from about 10 to about 85 parts of said PVA per 100 parts of converted starch.

A likewise polymer or copolymer content of from 10 to 65 parts, and particularly from 20 to 40 parts with respect to 100 parts of converted starch is also highly suitable.

Preferred alkenol copolymers are those containing vinyl alcohol units and aliphatic chain units as obtained by co-polymerization of vinyl acetate with ethylene and/or propylene, preferably with ethylene and subsequent hydrolysis of the vinyl acetate group. Such copolymers may have differing degrees of hydrolysis.

Preferred are ethylene/vinyl alcohol polymers (EVOH) and propylene/vinyl alcohol polymers. Most preferred are the ethylene/vinyl alcohol polymers. The molar ratio of vinyl alcohol units to alkylene units is preferably from about 40:60 to about 90:10 and preferably from about 45:55 to about 70:30. The most preferred EVOH has an ethylene content of about 42 mol % to about 48 mol %.

Preferably the converted starch is formed into a melt in the presence of water which may be present in the starting composition, from which the composition of the present invention is made by melt formation, at between about 0.5 and about 40% by weight, based on the total weight of the starting composition.

The composition according to the invention may have a water content between 1% and 40%, and has a preferred water content of between about 5 and about 20% by weight, and preferably of between about 8 and about 14% by weight, and particularly of about 12% by weight, based on the weight of the composition as explained herein.

The converted starch may be mixed with the polymer or copolymer and optionally other additives as mentioned herein in any desired sequence. For example, the converted starch may be mixed with all of the intended additives, including polymer or copolymer to form a blend, which blend may then be heated to form a uniform melt which will, in general, be thermoplastic.

The converted starch may, however, be mixed with optional additives, the converted starch melted and granulated before addition of the polymer or copolymer, for example the polyvinyl alcohol, which mix may then be further processed.

Preferably, however, the converted starch is mixed with additives together with the polymer or copolymer, for example polyvinyl alcohol, to form a free flowing powder, which is useful for continuous processing, and melted and either granulated or extruded directly into the solidified composition of the present invention.

The composition may optionally consist at least of the combination of converted starch and one member selected from alkenol homopolymers and copolymers which have been pre-processed. Such pre-processing may involve the provision of granulates or pellets which have been manufactured under conditions sufficient to have obtained uniform melt formation of the components.

Alternatively, and or additionally, the alkenol homopolymers and copolymers may have been pre-plasticised with, for example, a polyhydric alcohol such as glycerol.

The converted starch present in the composition may have been pre-melted in the presence of from 15 to 40% moisture, by weight thereof, and at a temperature and pressure within the ranges as given above.

Optionally the composition comprises at least one member selected from the group consisting of extenders, fillers, lubricants, mould release agents, plasticisers, stabilisers, coloring agents, and flame retardants.

The extenders include water-soluble an/or water-swellable polymers including known thermoplastic polymers such as gelatin, vegetable gelatins, acrylated proteins; water-soluble polysaccharides such as: alkylcelluloses, hydroxyalkylcelluloses and hydroxyalkylalkylcelluloses, such as: methylcellulose, hydroxymethylcellulose, hydroxyethylcellulose, hydroxypropylcellulose, hydroxyethylmethylcellulose, hydroxypropylmethylcellulose, hydroxybutylmethylcellulose, cellulose esters and hydroxyalkylcellulose esters such as: cellulose acetylphtalate (CAP), hydroxypropylmethyl-cellulose (HPMCP); carboxyalkylcelluloses, carboxyalkyl-alkylcelluloses, carboxyalkylcellulose esters such as: carboxymethylcellulose and their alkali-metal salts; the analogous derivatives of converted starch as named for all the cellulose derivatives above; water-soluble synthetic polymers such as: poly(acrylic acids) and their salts and essentially water soluble poly(acrylic acid) esters, poly(methacrylic acids) and their salts and essentially water-soluble poly(methacrylic acid) esters, essentially water soluble poly(vinyl acetates), poly(vinyl acetate phthalates) (PVAP), poly(vinyl pyrrolidone), poly(crotonic acids); cationically modified acrylates and methacrylates possessing, for example, a tertiary or quaternary amino group, such as the diethylaminoethyl group, which may be quaternized if desired; and mixtures of such polymers.

By the term "water-soluble or water-swellable polymer" is meant a polymer which absorbs or adsorbs at least 30% of water by weight with respect to that of the dry polymer when such is immersed in liquid water at room temperature.

Suitable fillers include, for example, wood-derived materials, and oxides of magnesium, aluminum, silicon, and titanium, wood flour, cellulose fibers and similar known materials. The fillers are present in the composition at a concentration of up to about 60% by weight, and preferably between about 20 and about 40%, by weight, based on the total weight of the composition.

The lubricants include stearates of aluminum, calcium, magnesium, and tin, as well as the free acid and magnesium silicate, silicones and substances such lecithin, and mono and diglycerides, which— for the purpose of the present invention—function in like-manner. Suitable lubricants further include unsaturated fatty acid amides, preferably amides of $C_{18}$–$C_{24}$ unsaturated fatty acids, such as the amide of cis-13-docosenoic acid (erucamide) and amides of $C_{12}$–$C_{24}$ carboxylic acids, such as the amide of docosanoic acid (behenamide). The particularly preferred lubricant is stearic acid, which is present in the composition in an amount of up to 10 parts per 100 parts of converted starch, preferably in an amount of from 1 to 3 parts per 100 parts of converted starch, and most preferably is present in the composition in an amount of 1 part per 100 parts of converted starch.

The composition of the present invention—particularly if used for foam production—may also comprise a nucleating agent having a particle size of from 0.01 to 5 microns, selected from the group consisting of silica, titania, alumina, barium oxide, magnesium oxide, sodium chloride, potassium bromide, magnesium phosphate, barium sulphate, aluminum sulphate, boron nitrate and magnesium silicate, or mixtures thereof. It is preferred that said nucleating agent is selected from amongst silica, titania, alumina, barium oxide, magnesium oxide, sodium chloride, and magnesium silicate, or mixtures thereof.

The particularly preferred nucleating agent is magnesium silicate (micro talcum), which is present in the composition in an amount of up to 10 parts of agent per 100 parts of converted starch. Preferably the agent is present in the composition in an amount of from 1 to 3 parts per 100 parts of converted starch, and most preferably in an amount of 2 parts per 100 parts of converted starch.

Plasticisers include urea and low molecular weight poly(alkylene oxides), such as, for example, poly(ethylene glycols), poly(propylene glycols) poly(ethylene-propylene glycols), organic plasticisers of low molecular mass, such as, for example, glycerol; pentaerythritol; glycerol monoacetate, diacetate, or triacetate; propylene glycol; sorbitol; sodium diethylsulfosuccinate; triethyl citrate and tributyl citrate and other substances which function in like manner.

Such plasticisers are preferably present in the composition at a concentration of between about 0.5% and about 40% by weight, and more preferably between about 0.5% and about 5% by weight, based on the weight of all of the components, including the water therein.

Preferably the sum of the plasticizer (including water where such is present as a plasticizer) content of the composition does not exceed about 25% by weight, and most preferably does not exceed about 20% by weight, based on the total weight of the composition.

Stabilisers include anti-oxidants such as thiobisphenols, alkylidenbisphenols, secondary aromatic amines; stabilisers against photo-decomposition, such as, for example, uv absorbers and quenchers; hydroperoxide decomposers; free radical scavengers, and antimicrobial agents.

Coloring agents include known azo dyes, organic or inorganic pigments, or coloring agents of natural origin. Inorganic pigments are preferred, such as the oxides of iron or titanium, these oxides being present in the composition at a concentration of between about 0.01 and about 10% by weight, and preferably present at a concentration of between about 0.05 and about 3% by weight, based on the total weight of the composition. Most preferably the coloring agents are present in the composition in an amount of about 0.03 to about 0.07% by weight with respect to the total composition. Iron oxide in an amount of 0.05% by weight with respect to that of the total compositions.

The composition may further comprise flame retardants which, for example, comprise phosphorous, sulphur and halogens, or mixtures thereof. Such flame retardants are known per se. These flame retardants are present in the converted starch-containing composition in an amount of from 0.1 to 10%, preferably from 1 to 6%, and most preferably from 2 to 4%, all percentages being by weight with respect to that of the converted starch component of the composition.

Other suitable flame retardants which may be present in the composition of the present invention include aluminum trihydrate; aluminum acetylacetonate; aluminum acetate; sodium aluminum hydroxy carbonate; magnesium aluminum hydroxy carbonate; antimony oxide; molybdic oxide; ammonium octamolybdate; zinc molybdate; magnesium hydroxide; zinc borate; ammonium pentaborate; boric acid; and sodium tetraborate. These flame retardants are generally available, and the Borax compounds in particular may be obtained from the United States Borax and Chemical Corporation, of 3075 Wilshire Boulevard, Los Angeles, Calif. 90010, U.S.A.

These latter flame retardants may be present in the composition in an amount of from 1 to 90% by weight with respect to the converted starch component of the composition, and preferably are present in the composition in an amount of from 20 to 80% and most preferably from 40 to 75%.

The particularly preferred flame retardants are guanidinium phosphate, ammonium polyphosphate and/or ethylenediamine polyphosphate (in the presence or absence of disodium orthophosphate), and guanidinium sulphate or ammonium sulphate.

Still further substances which may be added to the composition include animal or vegetable fats, preferably in their hydrogenated forms, especially those which are solid at room temperature. Such fats preferably have a melting point of at least 50° C. and include triglycerides of C12-, C14-, C16- and C18-fatty acids.

The fats are added to the material comprising the thermoplastic melt alone without extenders or plasticisers, or to the melt together with mono- or di- glycerides or phosphatides, of which lecithin is preferred. Said mono- and diglycerides are preferably derived from said animal or vegetable fats.

The total concentration of said fats, mono-, di- glycerides and phosphatides may be up to 5% by weight, based on the total weight of the composition.

Still further compounds which may be added to, or present in the composition include boron-containing compounds, particularly so when the composition is formed into films, sheets or fibers. The presence of such compounds in the composition yields articles which have improved transparency, Young's modulus and tear strength. The preferred boron-containing compounds are boric acid, metaboric acid, alkali and alkaline earth metal salts, borax and derivatives thereof. Said compounds may be present in the composition in an amount of between 0.002 and 0.4%, by weight with respect to that of the composition, and preferably are present at a concentration of between about 0.01 and 0.3%, likewise by weight.

Inorganic salts of alkali or alkaline earth metals, particularly LiCl and NaCl may be additionally present in the composition in an amount of between 0.1 and 5% by weight with respect to that of the total composition. The presence of such salts in the composition still further improves the Young's modulus, transparency and tear strength of articles made from the composition.

It will be appreciated that the concentration of the components, particularly the coloring agents and borax containing compounds, in the composition can be derived according to a Master-batching process, if desired.

The compositions described herein above form thermoplastic melts on heating under conditions of controlled temperature and pressure. Insofar as such melts may be processed by any conventional shaping process the present invention also refers to such processes when used to shape the composition or melt of the present invention. Thus such melts can be processed in the manner used for conventional thermoplastic materials, such as injection molding, blow molding, extrusion, coextrusion, compression molding, vacuum forming, and thermoforming to produce shaped articles. Whilst such articles include containers, cartons, trays, cups (particularly for candles where the composition comprises a flame retardant), dishes, sheets, and packaging materials, including the loose fill variety, the shaped articles also include pellets and granulates which may be ground to make powders for use in the manufacture of shaped articles. Particularly preferred articles are in foamed form, in injection moulded form or are in extruded form.

The range of pressures and temperatures suitable for injection molding, filming, foaming and extrusion molding are as disclosed herein below.

Extrusion and Injection Molding of the Composition

In order to melt the converted starch composition according to the invention, it is heated at a sufficient temperature for a time sufficient to enable uniform melt formation.

The composition is preferably heated in a closed volume, such as a closed vessel, or in the finite volume created by the sealing action of unmolten feed material, which action is apparent in the screw and barrel of an extruder or injection molding equipment.

Thus said screw and barrel is to be understood as a closed volume. Pressures created in such a volume correspond to the vapor pressure of the plasticizer (usually water) at the used temperature. It will be appreciated that pressures may be applied or generated, as is known to be possible in the use of said screw and barrel.

The preferred applied and/or generated pressures are in the range of pressures which occur in extrusion are known per se, being up to about $150 \times 10^5 N/m^2$, preferably up to about $75 \times 10^5 N/m^2$ and most preferably up to about $50 \times 10^5 N/m^2$. In injection molding processes these pressures are very often exceeded. Injection molding pressures are known to the expert in the art.

The temperature used in injection molding of the composition is preferably within the range of 100° C. to 220° C., more preferably within the range of from 160' C. to 200° C., and most preferably within the range of 160° C. to 180° C., the precise temperature being dependent on the type and nature of the converted starch used. In terms of ease of processing it is preferred that potato or corn converted starch is used.

A method for producing the composition in the form of a melt therefore is characterized by: a) providing a starting composition comprising converted starch, a plasticizer and at least one member selected from alkenol homopolymers and/or alkenol copolymers which are present in the composition at a concentration of from 10 to 200 parts per 100 parts of said converted starch; b) adjusting the plasticizer content of the composition to between about 0.5 and about 40% by weight of the total composition during processing or plastification; c) heating the thereby adjusted composition in a closed volume at a temperature of between 100° and 220° C. and at a pressure corresponding at least to the moisture vapor pressure at said temperature for a time at least sufficient to form a uniform melt of the composition;and d) removing any excess moisture before the extruder die to obtain a moisture content of between about 1% and about 20%.

The thus obtained melted converted starch composition is further processed e.g. granulated and is ready to be mixed with further components according to a chosen mixing and processing procedure to obtain a granular mixture of melted converted starch starting material to be fed to the screw barrel.

Filming of the Composition

The composition is plasticised as above, except that preferably it is heated to a temperature typically about 10° C. to about 20° C. higher than those routinely used during injection molding and extrusion of the composition.

Foaming of the Composition

The process for forming the composition of the present invention into foams comprises: a) providing a starting composition comprising converted starch, a plasticizer and at least one member selected from alkenol homopolymers and/or alkenol copolymers which are present in the composition at a concentration of from 10 to 200 parts per 100 parts of said converted starch; b) adjusting the plasticizer content of the composition to between about 0.5 and about 40% by weight of the total composition during processing or plastification; c) heating the thereby adjusted composition in a closed volume at a temperature of between 100° and 220° C. and at a pressure corresponding at least to the moisture vapor pressure at said temperature for a time at least sufficient to form a uniform melt of the composition; d) removing any excess moisture before the extruder die to obtain a moisture content of between about 5% and about 20%; and e) extruding the thereby heated composition under conditions whereby the extrudate assumes a cross section greater than that of the exit orifice of the extruder die.

It is preferred that the plasticizer is water and that, prior to extrusion, the moisture content of the composition is adjusted to between 14% and 20%, more preferably between 16% and 18% and most preferably to 17% by weight of the total composition, and that the composition is heated at a temperature of from about 160° C. to about 200° C. and most preferably from about 180° C. to about 200° C., and at a pressure corresponding at least to the moisture vapor pressure at said temperature for a time of at least 30 seconds.

Such compositions in the form of a foam have preferably a bulk density in the range of about 8.5 to about 30 kg/m³, preferably in the range of about 10.0 to about 15.5 kg/m³. These foams further have a resiliency which preferably is in the range of about 46 to 63% and a compressibility preferably in the range of about 6 to 15%.

The composition may be moulded subsequent to its extrusion using known thermoforming processes.

The invention will be further apparent from a consideration of the following Examples.

All samples were compounded on a 34 mm Leistritz twin screw extruder (Leistritz LSM 34) at a set melt temperature of about 200° C. according to known techniques. All samples contained 1.0% by weight of Boeson, i.e. a partially hydrolysed fat, and 0.5% by weight of lecithin, both calculated to the weight of dry starch and were molded at a moisture content of about 16% by weight calculated to the total composition. Pressures were applied as necessary to avoid the formation of water vapor at said temperatures.

EXAMPLE 1

Table I compares the injection pressure and melt temperatures required for molding 2 mm (thickness) tensile bars on a 75 ton Cincinatti Milicron Injection molding machine. All future example properties and molding conditions are for the same tensile bars made with this injection molding machine. Table I compares processing conditions of (i) a native corn starch (Melogel TM (registered Trademark of National Starch and Chemical Co. U.S.A.), containing about 70 percent amylopectine), and two high amylose starches, i.e. (ii) high amylose corn starch (Hylon TM VII (registered Trademark of National Starch and Chemical Co, U.S.A.), containing about 70 percent amylose) and (iii) converted high amylose corn starch (Hylon VII starch fluidity, fluidity level, 8.8% solids test, calcium chloride viscosity: about 40 seconds).

It is observed that the fluidity Hylon VII starch can be molded at lower melt temperatures and lower injection pressures than the monconverted Hylon VII starch. The native corn starch (Melogel) molds at an intermediated injection pressure than the two Hylon starches. It is known in the art that branched molecules versus linear molecules at equivalent molecular weights typically exhibit a lower melt viscosity.

Table I further lists the moisture levels in the molded samples after humidity conditioning for one week at various relative moisture levels.

TABLE I

|  | Melogel | Hylon VII starch | Hylon VII starch Fluidity |
|---|---|---|---|
| Inj. Pr. | 18500 psi | 20,000 psi | 15000 psi |
| Melt Temp. | 159 | 175 | 164 |
| (°C.) | (319° F.) | (348° F.) | (328° F.) |
| Moisture (%) |  |  |  |
| 10% RH | 8.1 | 5.7 | 6.8 |
| 50% RH | 11.6 | 9.9 | 11.1 |
| 90% RH | 17.7 | 16.2 | 15.7 |

RH = relative humidity,
Inj. Pr. = Injection Pressure

Table II lists the physical properties of the Hylon VII starch versus converted Hylon VII starch Fluidity (Fluidity level of about 40 sec. as given above).

TABLE II

| Sample | Conditioning (1 week) | Tensile mod. (psi) | Tensile Str. (psi) | El at Break (%) |
|---|---|---|---|---|
| Hylon VII starch | 10% RH | 650,000 | 7800 | 3.5 |
|  | 50% RH | 540,000 | 7200 | 16.0 |
|  | 90% RH | 290,000 | 2800 | 21.2 |
| Converted Hylon VII starch | 10% RH | 740,000 | 4000 | 1.0 |
|  | 50% RH | 580,000 | 7000 | 3.2 |
|  | 90% RH | 380,000 | 4000 | 4.9 | mod. = modulus;
str. = strength;
el. = elongation

The converted Hylon VII starch is stiffer at all humidities which can be attributed to its ability to crystallise more efficiently due to enhanced mobility of lower molecular weight molecules. The Hylon VII starch exhibits superior Strength and elongation (toughness) at all humidities attributed to its higher molecular weight.

In conclusion, Example 1 confirms that for neat starch thermoplastics compositions, the expected processing and property trends as a function of the average molecular weight were observed.

EXAMPLE 2

65 parts of Hylon VII starch and 65 parts of converted Hylon VII starch were each separately compounded with 35 parts of ethylene-vinylalcohol-copolymer (EVOH, E105 from Evalco Co.) on a 34 mm Leistritz co-rotating twin screw extruder at a set melt temperature of 200° C.

Table III lists the moisture contents, melt temperatures, and injection pressures required for molding 2 mm tensile bars and gives a comparison of (a) Hylon VII starch versus (b) converted Hylon VII starch, both blended with ethylene-vinylalcohol-polymer (E105 from Evalco Co.) as described in this Example.

TABLE III

| Sample | Melt Temp. (°C.) | Moisture (%) | Injection pressure (psi) |
|---|---|---|---|
| Hylon VII starch/EVOH | 176 (350° F.) | 15 | 18000 |
| Converted Hylon VII starch/EVOH | 176 (350° F.) | 12 | 14000 |

The Blend with converted Hylon VII starch was easier to process as enduced by the ability to mold at lower injection pressure even at lower water content.

Table IV lists the physical properties of these two blends obtained by conditioning at 10, 50 and 90 percent relative humidity (RH).

TABLE IV

| Sample | Conditioning (1 week) | Moisture (%) | Tens. Mod. (psi) | Tens. Str. (psi) | El at Break (%) |
|---|---|---|---|---|---|
| Hylon VII starch /EVOH | 10% RH | 7.0 | 410,000 | 6800 | 4.0 |
|  | 50% RH | 8.4 | 380,000 | 5000 | 45 |
|  | 90% RH | 11.7 | 139,000 | 3000 | 200 |
| Converted Hylon VII starch /EVOH | 10% RH | 7.0 | 420,000 | 6000 | 1.5 |
|  | 50% RH | 7.7 | 395,000 | 5000 | 12.0 |
|  | 90% RH | 11.2 | 142,000 | 2700 | 195 |

Tens. Mod. = tensile modulus;
Tens. Str. = tensile strength
El at Break = elongation at break The modulus and strength of these two systems are now equivalent at all humidities whereas the neat starches without EVOH exhibited quite different physical properties (Example 1). The elongation at break remains lower for the converted starch blends. Converted starch/EVOH blends give enhanced processability concomitant with strength and modulus equivalent to the higher molecular weight starch/EVOH blend. The converted starch/EVOH blends absorb less water at 50% and 90% RH than the higher molecular weight/EVOH blends, an indication of enhances moisture resistance.

EXAMPLE 3

Two blends were prepared consisting of converted Hylon VII starch/EVOH (Evalco E105)/polyvinylalcohol (PVOH, Airvol 203 from Air Products Co.)/Glycerine at a ratio of 45/45/8/2 parts by weight. In one blend the converted Hylon VII starch had a Stormer viscosity of 40 seconds and the second with a converted Hylon VII starch exhibiting a Stormer viscosity of 20 seconds.

Table V lists the processing conditions for the 2 blends for injection molding.

TABLE V

| Sample | Moisture (%) | Melt Temp. (°C.) | Inj. Pressure (psi) |
| --- | --- | --- | --- |
| Blend 1 | 9.7 | 168 | 11000 |
| (20 sec. fluidity) | 13.3 | 168 | 9000 |
| Blend 2 | 11.5 | 182 | 13000 |
| (40 sec. fluidity) | 15.6 | 182 | 9000 |

The 40 fluidity starch terblend (Blend 2) required higher melt temperatures and higher injection pressure than the 20 fluidity starch terblend (Blend 1) when molded at similar moistures, i.e., the lower molecular weight converted starch led to enhanced processability.

Table lists the physical properties of the two blends, i.e. as molded and after conditioning for 1 week at 10% RH and 90% RH.

TABLE VI

| Sample | Conditioning (1 week) | Moisture Content (%) | Tens. Mod. (psi) | Tens. Str. (psi) | El at Break (%) |
| --- | --- | --- | --- | --- | --- |
| Blend 1 | As molded | 9.3 | 62000 | 3021 | 221 |
| (20 sec. fluidity) | 10% RH | 7.5 | 125000 | 3084 | 147 |
| | 90% RH | 8.0 | 105000 | 3191 | 190 |
| Blend 2 | As molded | 14.7 | 30000 | 1600 | 294 |
| (40 sec. fluidity) | 10% RH | 8.0 | 172000 | 2600 | 197 |
| | 90% RH | 12.8 | 47000 | 1700 | 278 |

Blend 1 exhibits a more cosistant property profile versus conditioning than Blend 2. This can be attributed to the lower molecular weight starch leading to better mixing and better blend quality. Comparing the samples at equal moisture content (8.0 percent) the lower molecular weight starch containing blend exhibits higher strength, equivalent elongation and a lower modulus than the blend containing the higher molecular weight starch (Blend 2).

When taking into account the enhanced processability of Blend 1, it appears to exhibit the best balance of processability and mechanical properties. The high elongation and strength in the blends containing the lower molecular weight starch is very useful and very surprising, i.e. could not be expected.

EXAMPLE 4

Blends were prepared from (a) 50 parts by weight of 20 Fluidity Hylon VII starch, and (b) 50 parts Flogel 40 (a lower molecular weight native corn starch), wherein each starch was blended with 50 parts of EVOH (Evalco G110). This example demonstrates the ability of also preparing lower molecular weight native corn starch blends with EVOH with surprising properties. Evalca G110 is a 48% ethylene, 30 MFI EVOH (low molecular weight EVOH).

Table VII lists the injection molding conditions for these blends which were observed

TABLE VII

| Sample | H₂O (%) | Melt Temp. (°C.) | Inj. Pressure (psi) |
| --- | --- | --- | --- |
| 20 Fluidity | 14.6 | 171 | 10,000 |
| Hylon VII starch/EVOH | 8.0 | 185 | 12,750 |
| Flogel 40 /EVOH | 13.5 | 171 | 10,000 |
| | 7.3 | 175 | 17,000 |

The Flogel 40/EVOH blend molds equivalent to the 20 fluidity Hylon VII starch/EVOH blend. Samples were molded at two different mositures each.

Table VIII compares the physical properties as molded and after conditioning for 1 week at 10% RH and 90% RH. As molded peoperties depend upon moisture level employed in the blend for processing.

TABLE VIII

| Sample | Conditioning (1 week) | % H₂O | Tens. Mod. (psi) | Tens. Str. (psi) | El at Break (%) |
| --- | --- | --- | --- | --- | --- |
| 20 Fluidity | As molded | 14.7 | 41000 | 1500 | 268 |
| Hylon VII | 10% RH | 6.8 | 375000 | 4600 | 1.8 |
| starch | 90% RH | 10.4 | 136000 | 2300 | 236 |
| /EVOH | As molded | 8.2 | 163000 | 3500 | 241 |
| | 10% RH | 6.1 | 333000 | 4000 | 1.6 |
| | 90% RH | 8.3 | 178000 | 3100 | 201 |
| Flogel 40 | As molded | 13.9 | 50,000 | 1900 | 233 |
| /EVOH | 10% RH | 8.4 | 343,000 | 5300 | 6.5 |
| | 90% RH | 12.0 | 123,000 | 2100 | 182 |
| | As molded | 7.2 | 352,000 | 5500 | 5.8 |
| | 10% RH | 6.10 | 420,000 | 5700 | 2.0 |
| | 90% RH | 9.0 | 224,000 | 350 | 4.4 |

Whilst one can not directly compare native corn starches to Hylon VII starch starches, the Flogel 40, a lower molecular weight corn starch exhibits enhanced processability concomitant with a good balance of physical properties. The physical properties of the 50/50 starch/EVOH (G110) blends were quite similar for Flogel 40 versus 20 fluidity Hylon VII starch. The Flogel 40 blends are stiffer at equivalent moisture levels. The examples supports the use of lower molecular weight Hylon VII starch or native corn starches in blends with EVOH for unexpected, novel blances of processability and physical properties.

It will be appreciated that it is not intended to limit the invention to the above examples only, many variations thereto and modifications thereof being possible to one skilled in the art without departing from its scope, which is defined by the appended claims.

What we claim is:

1. A biodegradable composition obtained from a melt comprising converted starch, wherein said converted starch has a 8.8% calcium chloride viscosity within the range of about 5 seconds to about 60 seconds, a plasticizer and a member selected from the group consisting of alkenol hompolymers, alkenol copolymers and combinations thereof, which are combined under conditions sufficient to ensure uniform melt formation, wherein the member is present in the composition at a concentration of from about 10 to about 200 parts per 100 parts of dry converted starch.

2. A biodegradable composition according to claim 1 wherein said converted starch is derived from at least one member selected from the group consisting of native starches of vegetable origin, which starches are derived from potatoes, rice, tapioca, corn, pea, rye, oats, wheat.

3. A biodegradable composition according to claim 1 or claim 2 wherein said converted starch is acid hydrolysed fluidity starch and wherein said acid hydrolysis has been carried out below the gelatinization point of the starch.

4. A biodegradable composition according to claim 3, wherein said converted starch is acid hydrolysed corn starch.

5. A biodegradable composition according to claim 1, wherein the 8.8% calcium chloride viscosity of said converted starch is from about 10 seconds to about 40 seconds.

6. A biodegradable composition according to claim 5, wherein the 8.8% calcium chloride viscosity of said converted starch is from about 20 seconds to about 40 seconds.

7. A composition according to claim 1, wherein the converted starch has an amylose content of from about 10% up to about 95%.

8. A composition according to claim 7, wherein the converted starch has an amylose content of between about 60 and about 95%.

9. A composition according to claim 1, wherein the converted starch has an amylose content between about 65% and about 80%.

10. A composition according to claim 1, wherein the converted starch has an amylose content of from about 10% up to about 45%.

11. A composition according to claim 1, wherein the converted starch has an amylose content of from about 10% up to about 35%.

12. A composition according to claim 7, wherein the converted starch has an amylose content of at least about 5 to about 10%.

13. A composition according to claim 1, in which the composition comprises from about 10 to about 120 parts of said polymer per 100 parts of converted starch.

14. A composition according to claim 1, in which the composition comprises from about 20 to about 85 parts of said polymer per 100 parts of converted starch.

15. A composition according to claim 1, in which the composition comprises from about 20 to about 40 parts of said polymer per 100 parts of converted starch.

16. A composition according to claim 1, in which the alkenol homopolymer is polyvinyl alcohol.

17. A composition according to claim 16, in which the polyvinyl alcohol is substantially completely hydrolysed.

18. A composition according to claim 16, in which the polyvinyl alcohol is hydrolysed to an extent of from about 70 to about 100 mol %.

19. A composition according to claim 16, in which the polyvinyl alcohol is hydrolysed to an extent of from about 87 to about 98 mol %.

20. A composition according to claim 16, in which the polyvinyl alcohol is hydrolysed to an extent of from about 96 to about 98 mol %.

21. A composition according to claim 16, in which the polyvinyl alcohol has a number average molecular weight of at least 10,000.

22. A composition according to claim 16, in which the polyvinyl alcohol has a number average molecular weight of from 20,000 to 100,000.

23. A composition according to claim 17, in which the polyvinyl alcohol has a number average molecular weight of from 160,000 to 250,000.

24. A composition according to claim 16, wherein the polyvinyl alcohol has a degree of hydrolysis of at least about 96% and has a number average molecular weight of from about 20,000 to about 100,000.

25. A composition according to claim 1, wherein the alkenol copolymer containing vinyl alcohol units and aliphatic chain units as obtained by co-polymerization of vinyl acetate with ethylene and/or propylene with subsequent hydrolysis of the vinyl acetate groups.

26. A composition according to claim 25, in which the copolymer comprises an ethylene/vinyl alcohol copolymer.

27. A composition according to claim 26, in which the molar ratio of vinyl alcohol units to alkylene units is from about 40:60 to about 90:10.

28. A composition-according to the preceding claim, in said molar ratio is from about 45:55 to about 70:30.

29. A composition according to claim 28, in which the ethylene vinyl alcohol has an ethylene content of about 42 mol % to about 48 mol %.

30. A composition according to claim 1, wherein the composition further comprises at least one member selected from the group consisting of extenders, fillers, lubricants, mold release agents, stabilizers, coloring agents, flame retardants, alkali or alkaline earth metal salts and boron-containing compounds.

31. A composition according to claim 30, in which said fillers are present in said composition at a concentration of between about 20% and about 40% by weight, bas ed on the weight of the composition.

32. A composition according to claim 30, in which said plasticisers are present in said composition at a concentration of between about 0.5% and about 40% by weight, based on the weight of the composition.

33. A composition according to claim 30, in which said plasticisers are present in said composition at a concentration of between about 0.5% and about 5% by weight, based on the weight of the composition.

34. A composition according to claim 32, further comprising water, wherein the sum of the plasticizer and water content of said composition does not exceed about 25% by weight, based on the weight of the composition.

35. A composition according to claim 31, in which said lubricants are selected from the group consisting of mono or diglycerides, lecithin and stearic acid.

36. A composition according to claim 35, in which the lubricant is stearic acid.

37. A composition according to claim 31, further comprising a nucleating agent, said nucleating agent having a particle size of from about 0.01 to about 5 microns, wherein said nucleating agent is selected from the group consisting of silica, titania, alumina, barium oxide, magnesium oxide, sodium chloride, potassium bromide, magnesium phosphate, barium sulphate, aluminum sulphate, boron nitrate and magnesium silicate or mixtures thereof.

38. A composition according to claim 37, wherein the nucleating agent is magnesium silicate (micro talcum).

39. A composition according to claim 30, in which the flame retardant is selected from the group consisting of guanidinium phosphate: diethyl-N,N-bis(2-hydroxyethyl)aminomethyl phosphonate; dimethyl methylphosphonate; phosphonic acid, methyl-, dimethylester, polymer with oxirane and phosphorous oxide; aliphatic phosphate/phosphonate oligomers; tributyl phosphate; triphenyl phosphate; tricresyl phosphate; 2-ethylhexyl diphenyl phosphate; and tributoxyethyl phosphate; bis (hydroxypropyl) sec-butyl phosphine oxide; polypropoxylated dibutyl pyrophosphoric acid; a mixture of phosphonic acid, methyl-,(5-ethyl-2-methyl-1,3,2-dioxaphosphorinan-5-yl)methyl ethyl ester, P-oxide and phosphonic acid, methyl-, bis [(5-ethyl-2-methyl-1,3,2-dioxaphosphorinan-5-yl)methyl] ester, P,P'-dioxide; ammonium polyphosphate; ethylendiamine polyphosphate; melamine phosphate; dimelamine phosphate; and microencapsulated red phosphorous.

40. A composition according to claim 30, wherein the flame retardant is ammonium polyphosphate or ethylendiamine polyphosphate or a mixture thereof.

41. A composition according to any claim 30, wherein the flame retardant is present in the composition in an amount of from about 0.1 to about 10%, by weight with respect to that of the converted starch component of the composition.

42. A composition according to claim 1, in which the bulk density of the composition is in the range of about 8.5 to about 30 kg/m$^3$.

43. A composition according to claim 42, in which the bulk density of the composition is in the range of about 10.0 to about 15.5 kg/m$^3$.

44. A composition according to claim 42, in which the resiliency of the composition is in the range of about 46 to 63%.

45. A composition according to claim 42, in which the compressibility of the composition is in the range of about 6 to 15%.

* * * * *

UNITED STATES PATENT AND TRADEMARK OFFICE
CERTIFICATE OF CORRECTION

PATENT NO. : 5,393,804

DATED : Februrary 28, 1995

INVENTOR(S) : Eric R. George, et al

It is certified that error appears in the above-indentified patent and that said Letters Patent is hereby corrected as shown below:

ON THE TITLE PAGE

Under [22] Filed:

"June 10, 1993" should read --June 1, 1993--.

COLUMN 1

Line 28, "Preferably" should read --Preferably,--.
Line 48, "substantial," should read --substantial--.

COLUMN 2

Line 7, "Surprisingly" should read --Surprisingly,--.
Line 30, "less," should read --less--.

COLUMN 3

Line 9, "plasticisers" should read --plasticizers--.
Line 40, "pre-plasticised" should read --pre-plasticized--.
Line 68, "stabilisers" should read --stabilizers--.

COLUMN 4

Line 19, "cation; c) heating" should read
    --cation; ¶ c) heating--.
Line 58, "oats," should read --oats, and--.

UNITED STATES PATENT AND TRADEMARK OFFICE
CERTIFICATE OF CORRECTION

PATENT NO. : 5,393,804
DATED : February 28, 1995
INVENTOR(S) : Eric R. George, et al It is certified that error appears in the above-indentified patent and that said Letters Patent is hereby corrected as shown below:

COLUMN 5

Line 4, "viscosity" should read --Viscosity--.

COLUMN 6

Line 34, "Inc," should read --Inc.,--.
Line 44, "Inc," should read --Inc.,--.

COLUMN 7

Line 47, "Preferably" should read --Preferably,--.

COLUMN 8

Line 28, "plasticis-" should read --plasticiz- --.
Line 29, "stabilisers" should read --stabilizers--.
Line 30, "an/or" should read --and/or--.

COLUMN 9

Line 38, "Plasticisers" should read --Plasticizers--.
Line 41, "plasticisers" should read --plasticizers--.
Line 47, "plasticisers" should read --plasticizers--.
Line 53, "Preferably" should read --Preferably,--.
Line 58, "Stabilisers" should read --Stabilizers--.
Line 60, "stabilisers" should read --stabilizers--.

UNITED STATES PATENT AND TRADEMARK OFFICE
CERTIFICATE OF CORRECTION

PATENT NO. : 5,393,804
DATED : February 28, 1995
INVENTOR(S) : Eric R. George, et al It is certified that error appears in the above-indentified patent and that said Letters Patent is hereby corrected as shown below:

COLUMN 10

Line 49, "plasticis-" should read --plasticiz- --.

COLUMN 11

Line 21, "Thus" should read --Thus,--.

COLUMN 12

Line 16, "tion;and" should read --tion; and--.

COLUMN 13

Line 26, "gel TM" should read --gel®--.
Line 29, "(Hylon TM" should read --(Hylon®--.
Line 37, "monconverted" should read --nonconverted--.

COLUMN 14

Line 13, "lise" should read --lize--.
Line 15, "Strength" should read --strength--.
Line 44, "Blend" should read --blend--.
Line 45, "enduced" should read --induced--.

COLUMN 15

Line 6, "enhances" should read --enhanced--.
Line 33, "Table" should read --Table VI--.

UNITED STATES PATENT AND TRADEMARK OFFICE
CERTIFICATE OF CORRECTION

PATENT NO. : 5,393,804
DATED : February 28, 1995
INVENTOR(S) : Eric R. George, et al It is certified that error appears in the above-indentified patent and that said Letters Patent is hereby corrected as shown below:

COLUMN 16

Line 6, "observed" should read --observed.--.
Line 21, "As molded" should read --Molded--.
Line 21, "peoperties" should read --properties--.
Line 39, "can not" should read --cannot--.
Line 40, "starch" should be deleted.
Line 41, "starch" should read --starch,--.
Line 47, "supports" should read --support--.
Line 49, "blances" should read --balance--.
Line 63, "hompolymers," should read --homopolymers,--.

COLUMN 17

Line 1, "claim 1" should read --claim 1,--.
Line 5, "oats," should read --oats, and--.
Line 8, "claim 2" should read --claim 2,--.

COLUMN 18

Line 4, "claim 17," should read --claim 16,--.
Line 36, "bas ed" should read --based--.

COLUMN 19

Line 17, "ethylen-" should read --ethylene- --.

UNITED STATES PATENT AND TRADEMARK OFFICE
CERTIFICATE OF CORRECTION

PATENT NO. : 5,393,804

DATED : Februrry 28, 1995

INVENTOR(S) : Eric R. George, et al

It is certified that error appears in the above-indentified patent and that said Letters Patent is hereby corrected as shown below:

<u>COLUMN 20</u>

Line 1, "any" should be deleted.

Signed and Sealed this

Twenty-second Day of August, 1995

*Attest:*

BRUCE LEHMAN

*Attesting Officer*   *Commissioner of Patents and Trademarks*